US011440355B2

(12) United States Patent
Suita

(10) Patent No.: US 11,440,355 B2
(45) Date of Patent: Sep. 13, 2022

(54) TIRE

(71) Applicant: Toyo Tire Corporation, Itami (JP)

(72) Inventor: Harunobu Suita, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/587,365

(22) Filed: Sep. 30, 2019

(65) Prior Publication Data

US 2020/0108676 A1 Apr. 9, 2020

(30) Foreign Application Priority Data

Oct. 3, 2018 (JP) .............................. JP2018-188135

(51) Int. Cl.
*B60C 19/00* (2006.01)

(52) U.S. Cl.
CPC ..................... *B60C 19/00* (2013.01)

(58) Field of Classification Search
CPC ............ B60C 15/0603; B60C 15/0607; B60C 2015/0617; B60C 2015/0621; B60C 2015/0625
See application file for complete search history.

(56) References Cited

U.S. PATENT DOCUMENTS

| 2004/0159383 A1* | 8/2004 | Adamson | ................ B60C 13/00 340/447 |
| 2007/0179267 A1* | 8/2007 | Suzuki | .................. B60C 1/0016 526/335 |
| 2008/0289736 A1* | 11/2008 | Adamson | ............ B60C 23/0493 152/152.1 |
| 2011/0175778 A1* | 7/2011 | Myatt | ................. B60C 23/0493 343/711 |
| 2012/0318427 A1 | 12/2012 | Nishio | |
| 2013/0037196 A1* | 2/2013 | Kodama | ............. B60C 15/0607 152/541 |
| 2016/0114633 A1* | 4/2016 | Miyasaka | .............. B29D 30/48 152/542 |

(Continued)

FOREIGN PATENT DOCUMENTS

| CN | 101279574 A | 10/2008 |
| CN | 102825984 A | 12/2012 |

(Continued)

OTHER PUBLICATIONS

Machine Translation: JP-2002178724-A, Niimura, Kyoji, (Year: 2020).*

(Continued)

*Primary Examiner* — Kendra Ly
(74) *Attorney, Agent, or Firm* — Maier & Maier, PLLC

(57) ABSTRACT

A tire includes: a bead filler extending to an outer side in the tire-radial direction of a bead core; a carcass ply folded around the bead core; a steel chafer arranged so as to cover the carcass ply around the bead core; a first pad covering an outer side in the tire-width direction of a folding end of the carcass ply, at the outer side in the tire-radial direction of the end part of the steel chafer; a second pad covering an outer side in the tire-width direction of the first pad; and side wall rubber covering at least part of the outer side in the tire-width direction of the second pad, in which an electronic component is provided between the second pad and the side wall rubber.

5 Claims, 8 Drawing Sheets

(56) References Cited

U.S. PATENT DOCUMENTS

2016/0303921 A1    10/2016   Miklic et al.
2017/0225524 A1*   8/2017   Tamura ............... B60C 23/0493

FOREIGN PATENT DOCUMENTS

| CN | 105539019 | A |   | 5/2016 | | |
|----|-----------|---|---|--------|---|---|
| CN | 105813863 | A |   | 7/2016 | | |
| CN | 107264189 | A |   | 10/2017 | | |
| JP | 2002178724 | A | * | 6/2002 | ......... | B60C 15/0607 |
| JP | 2008-265750 | A |   | 11/2008 | | |
| JP | 20131223 | A |   | 1/2013 | | |
| JP | 201637235 | A |   | 3/2016 | | |
| JP | 201683814 | A |   | 5/2016 | | |
| JP | 2017222294 | A |   | 12/2017 | | |
| KR | 20100120505 | A | * | 11/2010 | | |
| WO | WO-2018104623 | A1 | * | 6/2018 | ......... | B29D 30/0061 |

OTHER PUBLICATIONS

Machine Translation: KR-20100120505-A, Jeong Jae Yeong, (Year: 2021).*
Machine Translation: WO-2018104623-A1, Lallement P, (Year: 2022).*
Li. "Tire Products Technology." Chemical Industry Press. Jun. 30, 1993. 5 pages. Partial machine-generated English translation provided.
Chinese Office Action dated Jun. 10, 2021, in connection with corresponding CN Application No. 201910909144.1 (15 pp., including machine-generated English translation).

* cited by examiner

TIRE

CROSS-REFERENCE TO RELATED APPLICATIONS

This application is based on and claims the benefit of priority from Japanese Patent Application No. 2018-188135, filed on 3 Oct. 2018, the content of which is incorporated herein by reference.

FIELD

The present invention relates to a tire in which an electronic component is embedded.

BACKGROUND

Conventionally, tires in which an electric component such as RFID is embedded within the rubber structure have been known. With such tires, by an RFID tag embedded in the tire and a reader as an external device carrying out communication, it is possible to perform production control of tires, usage history management, etc. For example, Japanese Unexamined Patent Application, Publication No. 2008-265750 shows a tire in which an electronic component is arranged at the boundary surface of two difference substances. The boundary surface of two substances at which this electronic component is arranged is a surface extending from a free edge of a carcass ply.

SUMMARY

With the technology shown in Patent Document 1, the boundary surface between two substances at which the electronic component is arranged becomes a surface extending from a free edge of the carcass ply; however, at this portion, stress and distortion tends to occur upon the tire deforming. Therefore, the electronic portion arranged at this portion is affected by the stress and distortion upon the tire deforming, and there is a possibility of no longer maintaining the function as an electronic component.

The present invention has been made taking account of the above-mentioned problem, and an object thereof is to provide a tire which can maintain the function of an embedded electronic component, by arranging the electronic component at a position which is hardly affected by the stress and distortion within the tire structure.

A tire (for example, the tire 1) according to a first aspect of the present invention includes: a bead core (for example, the bead core 21); a bead filler (for example, the bead filler 22) which extends to an outer side in a tire-radial direction of the bead core; a carcass ply (for example, the carcass ply 23) which extends from the bead core to another bead core and is folded around the bead core; a reinforcement ply (for example, the steel chafer 31) disposed so as to cover the carcass ply around the bead core; a first pad (for example, the first pad 35) which covers an outer side in a tire-width direction of a folding end (for example, the folding end 25A) of the carcass ply which was folded back, at an outer side in the tire-radial direction of an end part (for example, the end part 31A) of the reinforcement ply; a second pad (for example, the second pad 36) which covers an outer side in the tire-width direction of the first pad; and side wall rubber (for example, the side wall rubber 30) which covers at least part of an outer side in the tire-width direction of the second pad, in which an electronic component (for example, the RFID tag 40) is provided between the second pad and the side wall rubber.

According to a second aspect of the present invention, in the tire as described in the first aspect, when defining, in a cross-sectional view in the tire-width direction, as a reference distance a distance along a tire-width direction outside surface of the second pad from a tire-radial direction outside end (for example, the tire-radial direction outside end 36A of the second pad 36) of the second pad until a proximal part (for example, the proximal part 36B) of a folding end of the carcass ply which is folded back, the electronic component may be arranged at the tire-width direction outside surface of the second pad within a range until a position 50% of the reference distance from a position of the tire-radial direction outside end of the second pad towards an inner side in the tire-radial direction.

According to a third aspect of the present invention, in the tire as described in the second aspect, the electronic component may be arranged at the tire-width direction outside surface of the second pad within a range from a position 40% of the reference distance until a position 50% of the reference distance from the tire-radial direction outside end of the second pad towards the inner side in the tire-radial direction.

According to a fourth aspect of the present invention, in the tire as described in the first to third aspects, the electronic component may be arranged so that a distance (for example, the distance S) in the tire-width direction between the electronic component and the carcass ply becomes at least the thickness of the carcass ply.

According to a fifth aspect of the present invention, in the tire as described in the first to fourth aspects, the electronic component may be covered by a first rubber sheet (for example, the first rubber sheet 431) serving as a protective layer arranged on an inner side in the tire-width direction of the electronic component, and a second rubber sheet (for example, the second rubber sheet 432) arranged on an outer side in the tire-width direction of the electronic component; and the first rubber sheet and the second rubber sheet may be configured from rubber having a higher modulus than the side wall rubber, and a lower modulus than the second pad.

According to the present invention, it is possible to provide a tire which can maintain the function of an embedded electronic component, by arranging the electronic component at a position which is hardly affected by the stress and distortion within the tire structure.

DETAILED DESCRIPTION

First Embodiment

Figure 1:
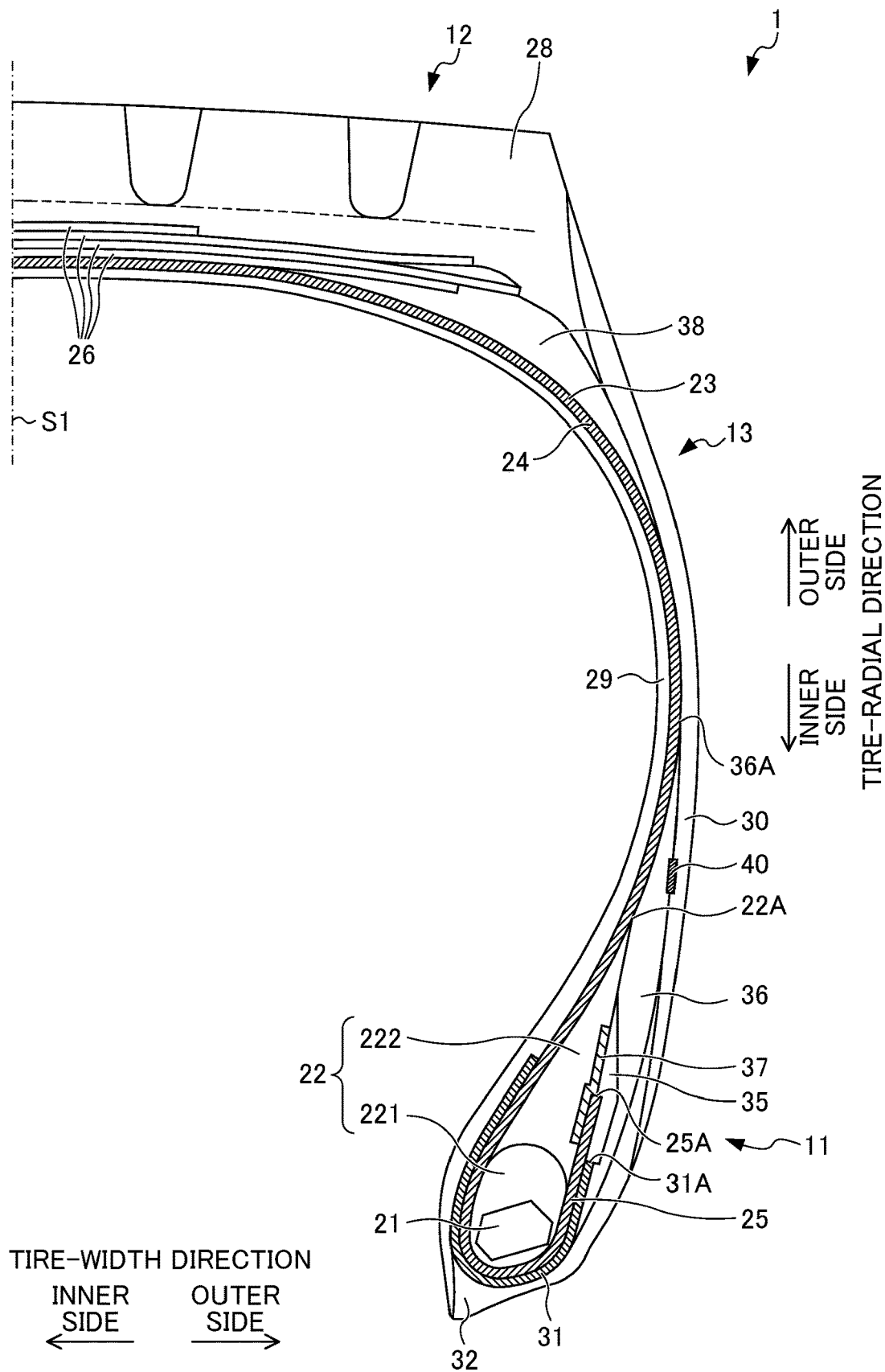
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer-side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2 and 5.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead filler 22 is configured by a first bead filler 221 which covers the outer circumference of the bead core 21, and a second bead filler 222 which is arranged on the outer side in the tire-radial direction of the first bead filler 221. The second bead filler 222 is configured from rubber with a modulus higher than an inner liner 29 and side wall rubber 30 described later. Then, the first bead filler 221 is configured from rubber of an even higher modulus than the second bead filler 222. It should be noted that the first bead filler 221 may be a form not covering the outer circumference of the bead core 21, if at least a part thereof is arranged on the outer side in the tire-radial direction of the bead core 21. In addition, the bead filler 22 may be formed from rubber of one type. In other words, it may not necessarily be divided into the first bead filler 221 and second bead filler 222. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22. The carcass ply 23 is configured by a plurality of ply cords extending in a tire-width direction. In addition, a plurality of ply cords is arranged side by side in a tire circumferential direction. This ply cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern (not illustrated) is provided to the outer surface of the tread rubber 28, and this outer surface serves as a contact surface which contacts with the road surface.

In the vicinity of the outer side in the tire-width direction of the tread 12, in a region between the carcass ply 23, and the steel belts 26/tread rubber 28, a shoulder pad 38 is provided. This shoulder pad 38 extends until a region of the outer side in the tire-radial direction of the side wall 13, and part thereof forms an interface between side wall rubber 30 described later. In other words, in the region of the outer side in the tire radial direction of the side wall 13, a part of the shoulder pad 38 is present on the inner side in the tire width direction of the side wall rubber 30. The shoulder pad 38 consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover at least part of the carcass ply 23.

The steel chafer 31 also extends to the outer side in the tire-width direction of the ply folding part 25 of the carcass ply 23, and an end part 31A of this steel chafer 31 is positioned more to the inner side in the tire-width direction than the folding end 25A of the ply folding part 25. This steel chafer 31 is a metal reinforcement layer configured by metal steel cords, and is covered by rubber.

Rim strip rubber 32 is provided at the inner side in the tire-radial direction of the steel chafer 31. This rim strip rubber 32 is arranged along the outer surface of the tire, and connects with the side wall rubber 30. This rim strip rubber 32 and side wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. This first pad 35 is provided so as to cover the outer side in the tire-width direction of at least the folding end 25A of the ply folding part 25. The outer side in the tire-radial direction of the first pad 35 is formed so as to taper as approaching the outer side in the tire-radial direction.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, part of the second bead filler 222, and part of the ply body 24 of the carcass ply 23. Then, the side wall rubber 30 is arranged at an outer side in the tire-width direction in a tire-radial direction outside region of the second pad 36, and the rim strip rubber 32 is arranged at an outer side in the tire-width direction in a tire-radial direction inside region of the second pad 36. In other words, the second pad 36 is provided between the first pad 35, etc., and the rim strip rubber 32 and side wall rubber 30, which are members constituting the outer surface of the tire.

Herein, the first pad 35 and second pad 36 are configured by rubber of higher modulus than the modulus of the bead filler (second bead filler 222) to which these members contact. In more detail, the second pad 36 is configured by rubber of higher modulus than the second bead filler 222, and the first pad 35 is configured by rubber of even higher modulus than the second pad 36. The first pad 35 and second pad 36 have a function of mitigating sudden distortion caused by the local rigidity point of change at the folding end 25A of the carcass ply 23 and the end part 31A of the steel chafer 31.

At the inner side in the tire-width direction of the first pad 35, a rubber sheet 37 is arranged in the vicinity of the folding end 25A of the ply folding part 25. The rubber sheet 37 is arranged so as to cover at least the folding end 25A of the ply folding part 25 from the inner side in the tire-width direction.

Generally, at the folding end 25A of the ply folding part 25, stress tends to concentrate. However, by providing the aforementioned first pad 35 and second pad 36, and further arranging the rubber sheet 37, it becomes possible to effective suppress the concentration of stress.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is established at an antenna length optimized according to the frequency band, etc. to be used. In a storage part inside the RFID chip, identification information such as a manufacturing number and part number is stored.

Figure 2:
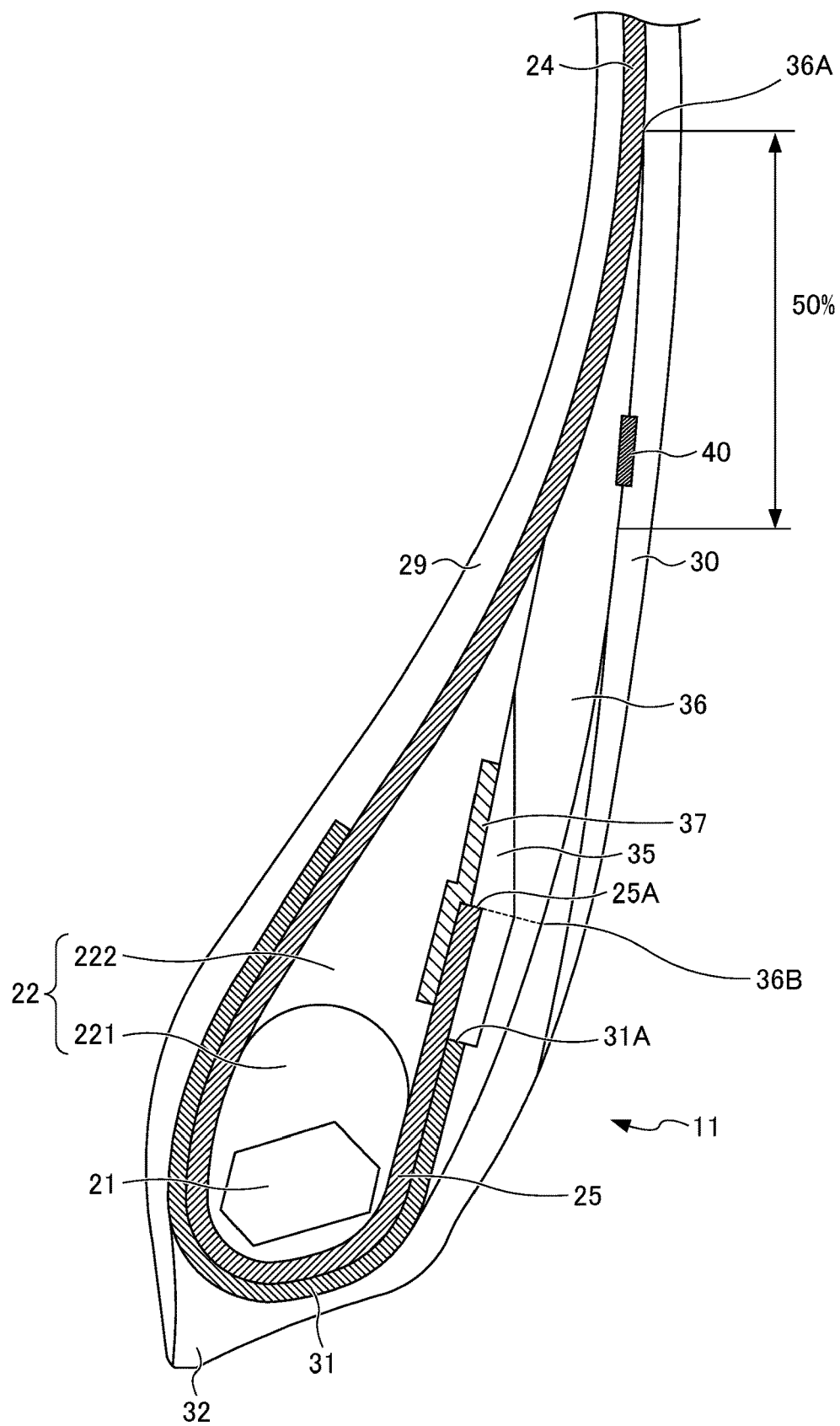
FIG. 2 is a partially enlarged cross-sectional view of a tire according to the first embodiment of the present invention.

FIG. 2 is an enlarged cross-sectional view showing the periphery of an embedded part of the RFID tag 40 in the tire 1 of FIG. 1. As shown in FIGS. 1 and 2, the RFID tag 40 is embedded between the second pad 36 and the side wall rubber 30.

Normally, in a case of the boundary surface of two substances being the surface extending from the folding end 25A of the carcass ply 23, distortion tends to occur at this surface. In addition, if considering the communication quality, it is preferable for the RFID tag 40 to be arranged as much as possible in a portion close to the outer surface of the tire 1.

Herein, in the present embodiment, the RFID tag 40 is embedded in the boundary surface between the second pad 36 and the side wall rubber 30, closer to the outer surface of the tire 1 than the boundary surface between the second bead filler 222 and first pad 35.

The RFID tag 40 can thereby keep the function thereof, without being affected by excessive distortion. Additionally, the RFID tag 40 is strongly retained due to being arranged to be retained to the second pad 36 consisting of rubber of higher modulus than the second bead filler 222.

It should be noted that, when establishing the modulus of the second pad 36 as a reference, it is preferable for the side wall rubber 30 to be established as a modulus 0.4 to 0.6 times that of the second pad 36. In addition, the first pad 35 is preferably established as a modulus 1.1 to 1.2 times that of the second pad 36. In addition, the second bead filler 222 is preferably established as a modulus of 0.7 to 0.8 that of the second pad. By establishing such a modulus, it is possible to keep the balance between flexibility as a tire and rigidity in the vicinity of the bead 11. It should be noted that the modulus indicates 100% elongation modulus (M100) under a 23° C. atmosphere, measured in accordance with "3.7 stress at a given elongation, S" of JIS K6251:2010.

Figure 3:
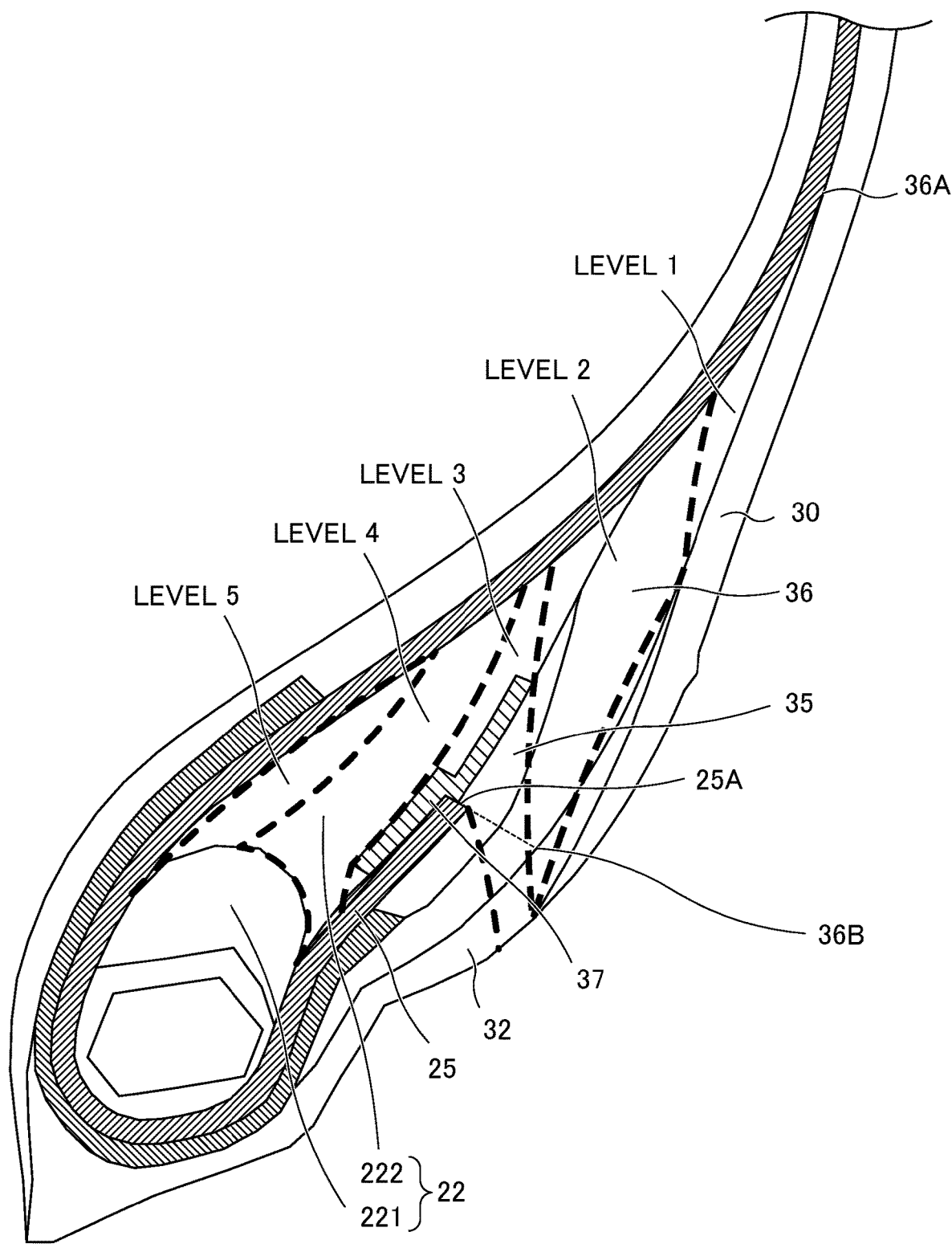
FIG. 3 is a view showing results of an in-plane distribution simulation of strain energy in a case of applying load to the tire of the first embodiment of the present invention.

FIG. 3 is a view showing the results of in-plane distribution simulation of strain energy, in a case of assembling the tire 1 of the present invention to a rim, and applying 100% load. The enlarged cross-sectional view shown in FIG. 3 displays by dividing the region in five, according to the magnitude of the strain energy. Herein, a region having the highest strain energy is defined as level 5, a region having high strain energy is defined as level 4, a region in which the strain energy somewhat declined is defined as level 3, a region in which the strain energy further declined is defined as level 2, and the region in which the strain energy declined the most is defined as level 1. FIG. 3 displays by dividing the regions with bold dotted lines as the boundary.

The boundary surface between the second pad 36 and side wall rubber 30 becomes a region of mostly level 1, and is a region having low strain energy, and thus very preferable upon arranging the RFID tag 40.

Then, the RFID tag 40 more preferably is arranged in a predetermined region on the outer side in the tire-radial direction, in the boundary surface between the second pad 36 and side wall rubber 30. This point will be explained using the graph of FIG. 4.

Figure 4:
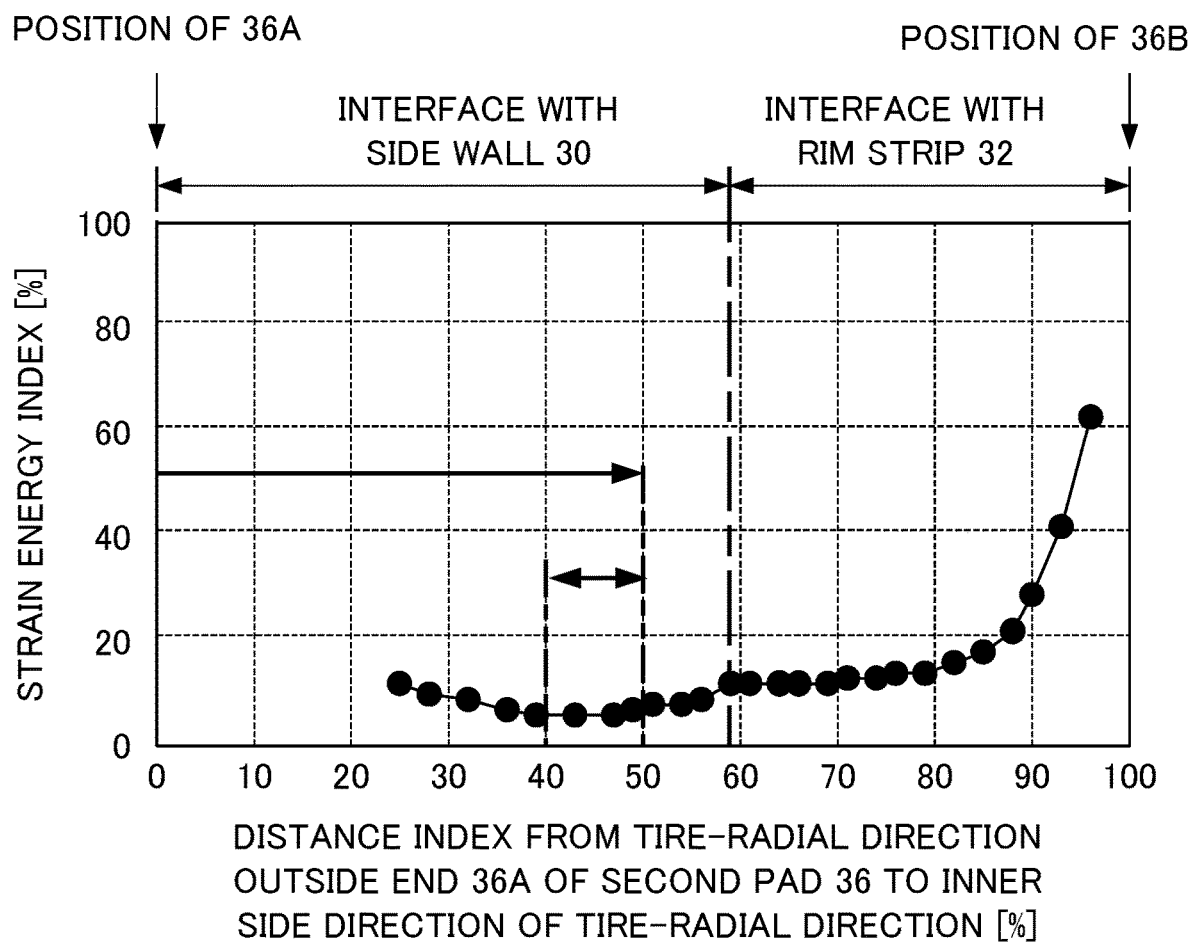
FIG. 4 is a graph showing a strain energy index in a case of applying load to the tire of the first embodiment of the present invention.

FIG. 4 is a graph showing the strain energy index, in a case of assembling the tire 1 of the present embodiment on a rim, and applying 100% load. The X axis in this graph is a distance index in a case of defining a distance along a tire-width direction outside surface of the second pad from the tire-radial direction outside end 36A of the second pad 36 until a proximal part 36B of the folding end 25A of the carcass ply 23 as a reference distance (100%), and the Y axis is a strain energy index when defining the strain energy at the proximal part 36B of the folding end 25A of the carcass ply 23 at the tire-width direction outside surface of the second pad 36 as 100%. Herein, the proximal part 36B of the folding end 25A of the carcass ply 23 is prescribed by the point of intersection between a line drawn from the ply folding end 25A of the carcass ply 23 in a direction orthogonal to the extending direction of the ply folding part 25 (shown by a dotted line in FIG. 2) and a line showing the outside surface in the tire-width direction of the second pad 36, in a cross-sectional view in the tire-width direction, as shown in FIG. 2. The proximal part 36B may be the closest point to the ply folding end 25A of the carcass ply 23 on the tire-width direction outside surface of the second pad 36 in a cross-sectional view in the tire-width direction, i.e. nearest point of the ply folding end.

As is evident from this graph, when the distance index exceeds 50%, the strain energy index rises. Consequently, the RFID tag 40 is preferably arranged within a range of from 0% to 50% distance index.

In more detail, the strain energy index shows the lowest value when the distance index is in the range of 40% to 50%. Consequently, the RFID tag 40 is more preferably arranged at a position such as that shown in the enlarged cross-sectional view of FIG. 5, i.e. within a range of 40% to 50% distance index.

In addition, when considering communication quality, the RFID tag 40 should be distanced from metal components.

Figure 5:
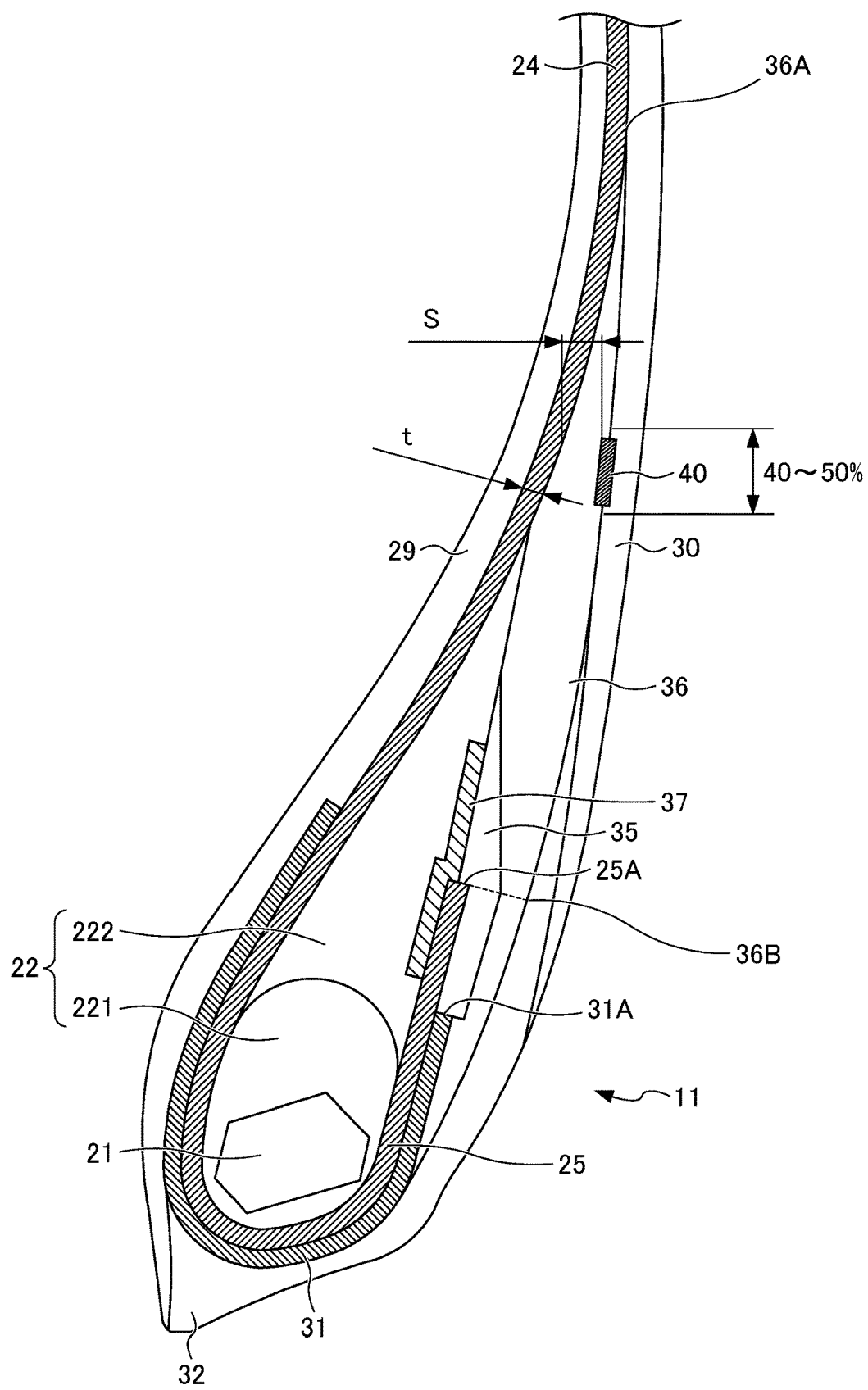
FIG. 5 is a partially enlarged cross-sectional view of the tire according to the first embodiment of the present invention.

Therefore, in the case of the carcass ply 23 being made from metal, it is preferable for the RFID tag 40 to be arranged so that the distance S in the tire-width direction between the carcass ply 23 and RFID tag 40 becomes at least the thickness t of the carcass ply 23, as shown in FIG. 5.

Herein, the RFID tag 40 is mounted before the vulcanization process in the manufacturing process of tires. In the present embodiment, the RFID tag 40 is mounted to the second pad 36 or the side wall rubber 30 prior to the rubber being vulcanized. At this time, the second pad 36 and side wall rubber 30 are in the state of raw rubber prior to vulcanization; therefore, the RFID tag 40 may be pasted to the second pad 36 and side wall rubber 30 using the adhesive property thereof. Alternatively, in a case of the adhesive property being low or the like, it may be pasted using an adhesive or the like. After pasting the RFID tag 40, the RFID 40 is interposed by the second pad 36 and side wall rubber 30. Subsequently, the green tire in which the respective constitutional parts including the RFID 40 are assembled is vulcanized in the vulcanization process to manufacture a tire.

In this way, in the present embodiment, since it is possible to paste the RFID tag 40 to the second pad 36 and side wall rubber 30 in the raw rubber state, at the time of tire manufacture, the assembly work of the RFID tag 40 in the manufacturing process of the tire is easy. In particular, the second pad 36 have a certain rigidity even in the raw rubber state, and thus the assembly work of the RFID tag 40 is easy.

It should be noted that the RFID tag 40 embedded in the tire, when including an antenna, often has a longitudinal direction, as shown as the RFID tag 40 in FIG. 6 described later. It is preferable for such an RFID tag 40 to be embedded in the tire 1, so that the longitudinal direction thereof is a direction of the tangential line to the circumferential direction of the tire, i.e. direction orthogonal to the paper plane in the cross-sectional views of FIGS. 1 and 2. By embedding in this way, stress is hardly applied to the RFID tag 40, when the tire deforms.

It should be noted that the RFID tag 40 may be interposed between the second pad 36 and side wall rubber 30 in a state covered by a protective member of rubber or the like; however, it may be interposed directly by the second pad 36 and side wall rubber 30, without covering with a protective member.

It should be noted that, in the present embodiment, although the RFID tag 40 is embedded in the tire as an electronic component, the electronic component embedded in the tire is not limited to an RFID tag. For example, it may be various electronic components such as a sensor which carries out wireless communication. In addition, since the electronic component handles electrical information such as sending and receiving of electrical signals, there is a possibility of the performance declining due to metal components being present in the vicinity thereof. In addition, there is a possibility of the electronic component being damaged by excessive stress being applied. Consequently, even in the case of embedding various electronic components in a tire, it is possible to obtain the effects of the present invention. For example, the electronic component may be a piezoelectric element or strain sensor.

According to the tire 1 of the present embodiment, the following effects are exerted.

(1) With the tire 1 according to the present embodiment, the RFID tag 40 is provided between the second pad 36 and side wall rubber 30. The RFID tag 40 can thereby keep the function thereof, without being affected by excessive distortion.

(2) With the tire 1 according to the present embodiment, when defining a distance along the tire-width direction outside surface of the second pad 36 from the tire-radial direction outside end 36A of the second pad 36 until the proximal part 36B of the folding end of the carcass ply 23 folded back as a reference distance (100%), the RFID tag 40 is arranged on the tire-width direction outside surface of the second pad 36 within a range up to a distance 50% of the reference distance from the position of the tire-radial direction outside end of the second pad 36 towards the inner side in the tire-radial direction. The RFID tag 40 is thereby even less influenced by distortion.

(3) With the tire 1 according to the present embodiment, the RFID tag 40 is arranged on the tire-width direction outside surface of the second pad within a range from a position 40% of the reference distance until a position 50% of the reference distance from the tire-radial direction outside end 36A of the second pad 36 towards the inner side in the tire-radial direction. The RFID tag 40 is thereby even less influenced by distortion.

(4) With the tire 1 according to the present embodiment, the electronic component is arranged so that the distance S in the tire-width direction between the RFID tag 40 and the carcass ply 23 becomes at least the thickness t of the carcass ply 23. It is thereby possible to ensure communication quality, even in a case of the carcass ply being made from metal.

Second Embodiment

Next, a tire according to a second embodiment will be explained while referencing FIGS. 6A to 6C. It should be noted that, in the following explanation, the same reference symbol will be attached for configurations which are the same as the first embodiment, and detailed explanations thereof will be omitted.

Figure 6A:
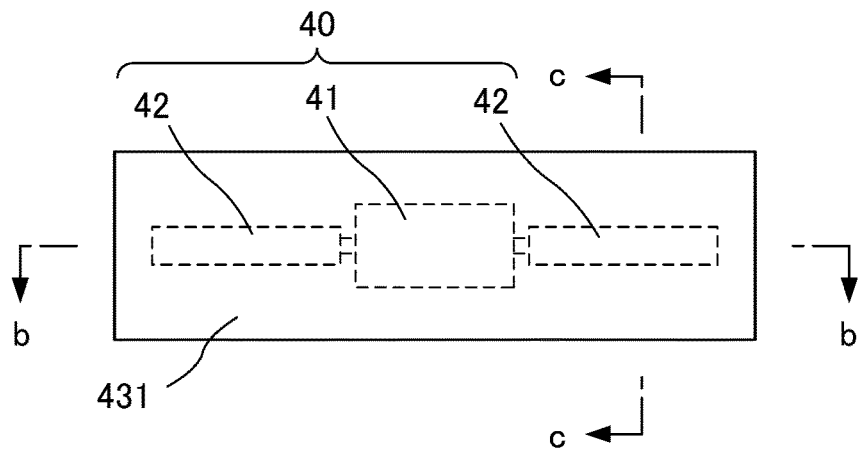
FIG. 6A is a view showing an RFID tag protected by a protective member in a tire according to a second embodiment of the present invention.
Figure 6B:
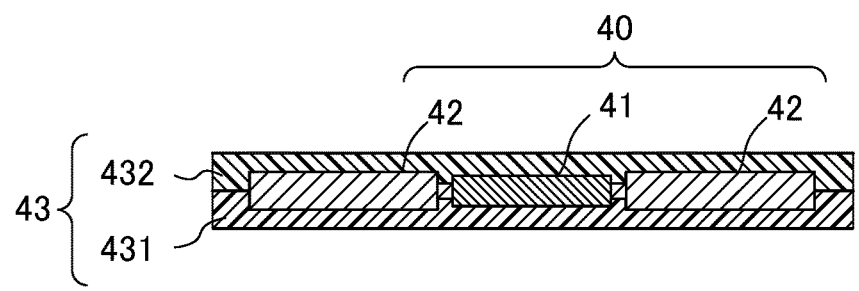
FIG. 6B is a view showing a b-b cross section in FIG. 6A.
Figure 6C:
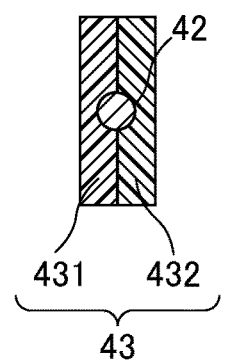
FIG. 6C is a view showing a c-c cross section in FIG. 6A.

FIG. 6A is a view showing the RFID tag 40 covered by a protective member 43 configured from a rubber sheet. In FIG. 6A, the RFID tag 40 is covered and hidden by the rubber sheet 431 described later. FIG. 6B is a cross-sectional view along the line b-b in FIG. 6A, and FIG. 6C is a cross-sectional view along the line c-c in FIG. 6A. In the present embodiment, as shown in FIGS. 6A to 6C, the RFID tag 40 is covered by the protective member 43.

The RFID tag 40 includes an RFID chip 41 and antenna 42 for performing communication with external equipment. As the antenna 42, a coil-shaped spring antenna, plate-shaped antenna, and various types of rod-shaped antennas can be used. For example, it may be an antenna formed by printing a predetermined pattern on a flexible substrate. When considering the communicability and flexibility, a coil-shaped spring antenna is the most preferable. The antenna is established at an antenna length optimized according to the frequency band, etc. to be used.

The protective member 43 is configured from two rubber sheets 431, 432 which protect by sandwiching the RFID tag 40.

The protective member 43 is configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used. For example, rubber having a higher modulus than the side wall rubber 30 and lower modulus than the second pad 36 is used.

For example, with the modulus of the side wall rubber 30 as a reference, as the rubber used in the protective member 43, it is preferable to use rubber of a modulus 1.1 to 1.8 times. At this time, as the rubber of the second pad 36, rubber of a modulus 1.6 to 3 times that of the side wall rubber, for example, rubber of a modulus on the order of 2 times thereof, may be used. It should be noted that, if emphasizing reinforcement of the protection of the RFID tag 40, rubber of a modulus higher than the second pad 36 may be adopted as the rubber used in the protective member 43.

It should be noted that, as shown in FIGS. 1 and 2, the RFID tag 40 is arranged in the region between the second pad 36 and side wall rubber 30. Therefore, by setting the modulus of the protective member 43 to a value with a higher modulus than the side wall rubber 30 and a lower modulus than the second pad 36, in the case of the tire distorting, it is possible to prevent excess stress from generating within the rubber structure at the embedded part of the RFID tag 40. In other words, it is possible to suppress the generation of stress.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as raw rubber, and thus can appropriately protect the RFID tag 40.

In addition, as the protective member 43, an organic fiber layer from polyester fibers or polyamide fibers may be provided. It is also possible to embed an organic fiber layer in the two rubber sheets 431, 432.

In this way, if configuring the protective member 43 by two rubber sheets, since it is possible to thinly form the RFID tag 40 including the protective member 43, it is favorable upon embedding in the tire 1. In addition, when assembling the RFID tag 40 in the constitutional members of the tire 1 prior to vulcanization, the RFID tag 40 covered by the rubber sheets can be installed very easily. For example, at a desired position of a member such as the second pad 36 and side wall rubber 30 prior to vulcanization, it is possible to appropriately paste the RFID tag 40 covered by the rubber sheets using the adhesiveness of the raw rubber. In addition, by also establishing the rubber sheets as raw rubber prior to vulcanization, it is possible to more easily paste by employing the adhesiveness of the rubber sheet itself as well.

However, the protective member 43 is not limited to the form configured by two rubber sheets, and can adopt various forms. For example, at least one rubber sheet constituting the protective member, so long as covering at least part of the RFID tag 40, can obtain effects such as an improvement in workability in the manufacturing process and stress mitigation. In addition, for example, it may be a configuration wrapping one rubber sheet around the entire circumference of the RFID tag 40, or a configuration attaching the protective member in the form of a potting agent of high viscosity along the entire circumference of the RFID tag 40. Even if such a configuration, it will be possible to appropriately protect the RFID tag 40.

It should be noted that the RFID tag 40 covered by the protective member 43 is embedded in the tire so that the longitudinal direction thereof becomes the direction of the tangential line relative to the circumferential direction of the tire, i.e. direction orthogonal to the paper plane in the cross-sectional view of FIGS. 1 and 2. In addition, the rubber sheets 431, 432 are embedded in the tire in a form such that aligns in the tire-width direction. In other words, in the manufacturing process, one surface of either one of the rubber sheets 431, 432 is pasted to a constituent member of the tire prior to vulcanization, e.g., the second pad 36. By establishing such a form, stress will hardly act on the RFID tag 40, even when the tire deforms. In addition, in the manufacturing process, the work of attaching the RFID tag 40 covered by the protective member 43 becomes easy.

According to the tire of the present embodiment, the following effects are exerted in addition to the above (1) to (4).

(5) In the present embodiment, the protective member 43 is configured from rubber having a higher modulus than the side wall rubber 30 and lower modulus than the second pad 36, and the RFID tag 40 covered by this protective member 43 is embedded in the tire. Consequently, since the modulus of rubber in the tire changes stepwise, in the case of the tire deforming, it is possible to prevent excessive stress occurring within the rubber structure in the RFID tag 40 embedded part.

Third Embodiment

Next, a tire according to a third embodiment will be explained while referencing FIGS. 7 to 13. It should be noted that, in the following explanation, the same reference symbol will be attached for configurations which are the same as the second embodiment, and detailed explanations thereof will be omitted. The present embodiment is a particularly preferable embodiment in the case of the antenna of the RFID tag 40 being a coil-shaped spring antenna.

In the RFID tag 40 of the present embodiment, a coil-shaped spring antenna 421 having high communicability and flexibility can be used as the antenna. The spring antenna 421 is set to an antenna length which was optimized according to the frequency band, etc. to be used.

In the present embodiment, prior to interposing the RFID tag 40 by the two rubber sheets 431, 432 constituting the protective member 43, the rubber is arranged within the spring antenna 421. More preferably, rubber is filled into the spring antenna, so that air will not remain as much as possible. This process and the reason for adopting this process will be explained using FIGS. 7 to 13.

Figure 7:
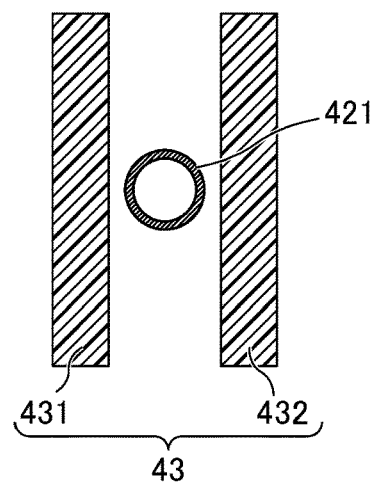
FIG. 7 is a view showing a cross section prior to interposing the RFID tag by rubber sheets in a case of not filling rubber inside a spring antenna.
Figure 8:
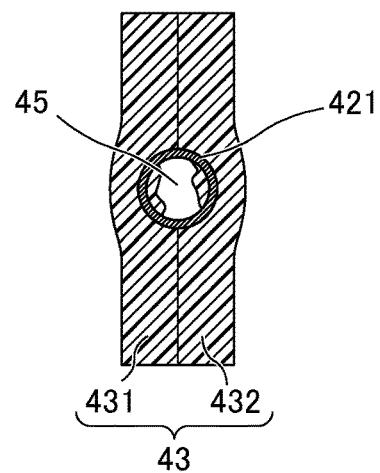
FIG. 8 is a view showing a cross section after interposing the RFID tag by rubber sheets in a case of not filling rubber inside a spring antenna.

First, a state of the surroundings of the RFID tag 40 in a case of not filling rubber into the spring antenna 421 will be explained as a reference example using FIGS. 7 to 9. FIG. 7 is a view showing a cross section of the spring antenna 421, and rubber sheets 431, 432, prior to interposing the RFID tag 40 by the rubber sheets 431, 432. FIG. 8 is a view showing a cross section of the spring antenna 421, and rubber sheets 431, 432, after interposing the RFID tag 40 by the rubber sheets 431, 432.

As shown in FIG. 8, in this reference example, since rubber is not filled into the spring antenna 421 in advance, a certain amount of air 45 may remain within the spring antenna 421 after interposing by the rubber sheets 431, 432. If air remains in this way, the integrity of the rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the rubber sheets 431, 432 herein. Consequently, by pushing the rubber sheets 431, 432 from both sides, the rubber sheets 431, 432 sticks to some extent inside the spring antenna as shown in FIG. 8. However, very large amounts of time and labor are required in order to stick the rubber sheets 431, 432 until the inside of the spring antenna is completely embedded.

Figure 9:
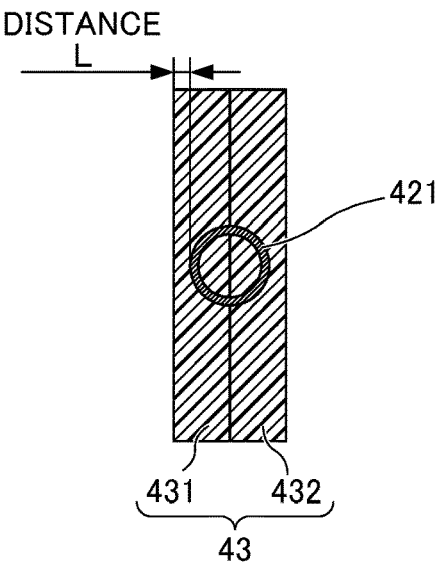
FIG. 9 is a view showing a cross section after interposing the RFID tag by rubber sheets in a case of not filling rubber inside a spring antenna.

Then, even if assuming a case of taking time and sticking the rubber sheets until the inside of the spring antenna is embedded, the distance L between the outer circumferential part of the spring antenna 421 and the outer surface of the rubber sheets 431, 432 becomes very short, as shown in FIG. 9. In addition, it is difficult to stabilize this distance L, and locally thin portions can occur. Consequently, the protection of the RFID tag 40 by the rubber sheets 431, 42 becomes insufficient, and during vulcanization, there is a possibility of the rubber sheets 431, 432 being damaged.

Therefore, in the present embodiment, prior to interposing the RFID tag 40 by the rubber sheets 431, 432, the rubber is arranged within the spring antenna 421, as shown in FIGS. 10 to 13. More preferably, rubber is filled within the spring antenna so that air does not remain as much as possible. It should be noted that the views shown on the right sides of FIGS. 10 to 13 are views showing a transverse section of the spring antenna 421 and the surrounding thereof.

Figure 10:
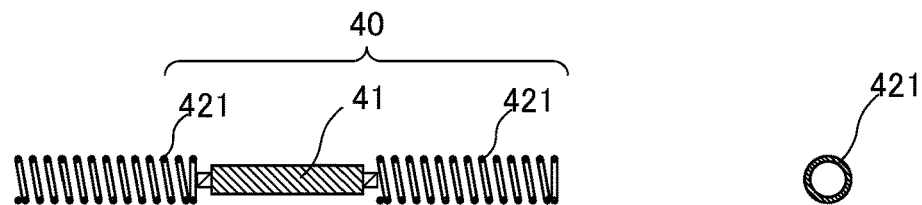
FIG. 10 is a view showing the RFID tag prior to filling rubber inside a spring antenna in a tire according to a third embodiment of the present invention.
Figure 11:
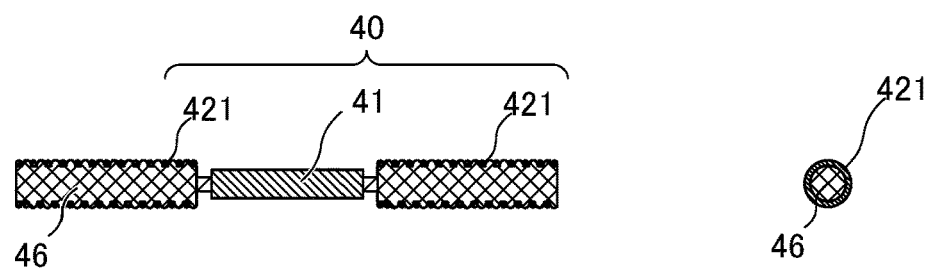
FIG. 11 is a view showing the RFID tag after filling rubber inside a spring antenna in a tire according to the third embodiment of the present invention.

FIG. 10 is a view showing a state prior to filling the rubber 46 into the spring antenna 421, and FIG. 11 is a view showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the rubber sheets 431, 432 as the rubber 46, in consideration of the workability, etc. It should be noted that preferably unvulcanized rubber is used as the rubber 46 arranged within the spring antenna 421. By establishing the rubber 46 and rubber sheets 431, 432 as unvulcanized rubber and vulcanizing simultaneously, the integrity of the rubber 46, rubber sheets 431, 432 and spring antenna 421 rises. In addition, the rubber 46, and rubber sheets 431, 432 are more preferably established as the same type of rubber. It should be noted that, by emphasizing the flexibility of the spring antenna 421, rubber of lower modulus than the rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 12:
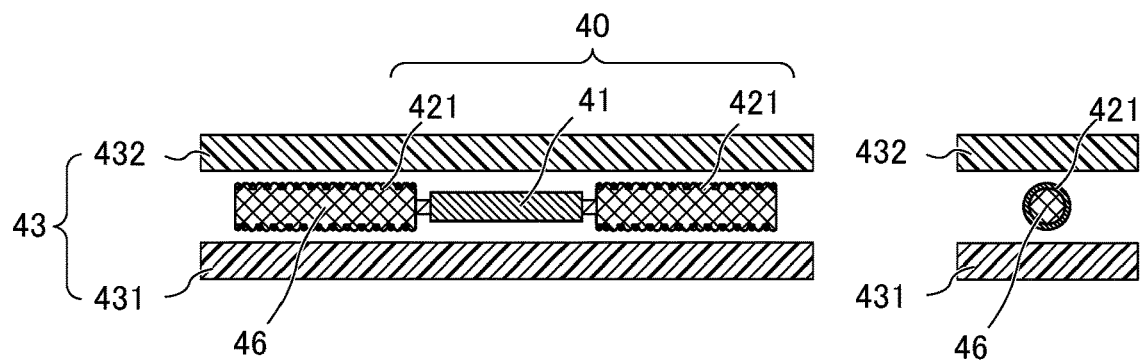
FIG. 12 is a view showing the RFID tag prior to interposing by rubber sheets, in a tire according to the third embodiment of the present invention.
Figure 13:
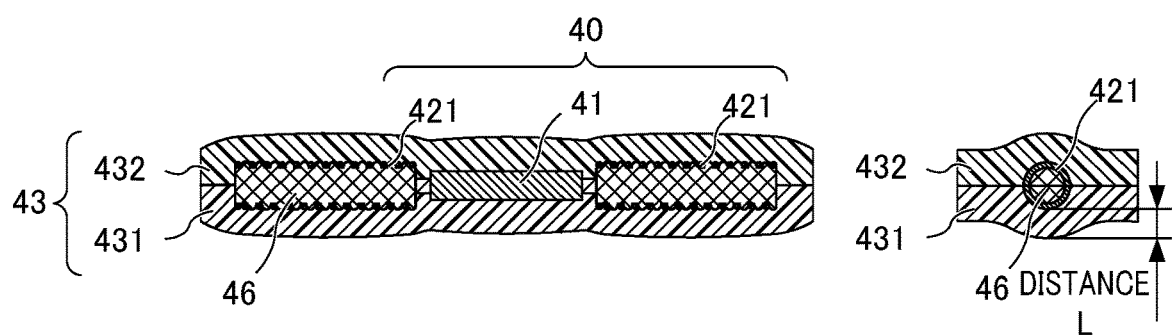
FIG. 13 is a view showing the RFID tag interposed by a rubber sheet, in a tire according to the third embodiment of the present invention.

FIG. 12 is a view showing a state prior to interposing the RFID tag 40 into which the rubber 46 is filled in the spring antenna 421, by the rubber sheets 431, 432, and FIG. 13 is a view showing a state after interposing by the rubber sheets 431, 432.

As shown in FIG. 13, according to the present embodiment, since the rubber 46 is filled in advance into the spring antenna 421, no air pockets exist between the rubber sheets 431, 432. Consequently, since it is unnecessary to be concerned over air pockets, the process of interposing the RFID tag 40 by the rubber sheets 431, 432 also becomes easy. In addition, by the rubber 46 being arranged within the spring antenna 421, the integrity of the spring antenna 421, rubber 46, and rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the rubber sheets 431, 432 stabilizes. In other words, a distance close to the thickness of the rubber sheets 431, 432 is generally secured as this distance L. Consequently, the RFID tag 40 is sufficiently protected by the rubber sheets 431, 432. In the present embodiment, the RFID tag 40 interposed by the rubber sheets 431, 432 is fixedly set up in the second pad 36, etc., and subsequently, the green tire is vulcanized.

According to the tire of the present embodiment, the following effects are exerted in addition to the above (1) to (5).

(6) The present embodiment provides a step of arranging the rubber 46 within the spring antenna 421 of the RFID tag 40 serving as an electronic component having a communication function; a step of interposing the RFID tag 40 having the spring antenna 421 into which the rubber 46 was arranged, by the rubber sheets 431, 432, and an arrangement step of arranging the RFID tag 40 interposed by the rubber sheets 431, 432 in the tire 1. The air 45 will thereby not remain inside the spring antenna 421. In addition, since it is unnecessary to be concerned about air pockets, the work of interposing the RFID tag 40 by the rubber sheets 431, 432 also becomes easy. In addition, since the distance L between the outer circumferential part of the spring antenna 421 and the outer surface of the rubber sheets 431, 432 is stabilized, the RFID tag 40 is sufficiently protected by the rubber sheets 431, 432. In the case of an embodiment in which the RFID tag 40 is embedded between the second pad 36 and side wall rubber 30 as in the tire of the present embodiment, i.e. case of being embedded in a portion of the tire near the outer surface, such air pocket countermeasures and enhanced protection measures are particularly effective.

It should be noted that, although the tire of the present invention can be adopted as various types of tires such as for cars, light trucks, trucks and buses, it is particularly suitable as a tire of a truck, bus, etc. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire comprising:
   a bead core; a bead filler which extends to an outer side in a tire-radial direction of the bead core; a carcass ply which extends from the bead core to another bead core and is folded around the bead core;
   a reinforcement ply disposed so as to cover the carcass ply around the bead core;
   a first pad which covers an outer side in a tire-width direction of a folding end of the carcass ply which was folded back, at an outer side in the tire-radial direction of an end part of the reinforcement ply;
   a second pad which covers an outer side in the tire-width direction of the first pad;
   side wall rubber which covers at least part of an outer side in the tire-width direction of the second pad; and
   a rubber sheet which is disposed between the bead filler and the first pad and covers an inner side in a tire-width direction of the folding end of the carcass ply which was folded back,
   wherein an electronic component is provided between the second pad and the side wall rubber, and the electronic component is sandwiched between two rubber sheets made of the same rubbers;
   wherein the electronic component includes an RFID chip and an antenna extending straight from the RFID chip to both sides of the RFID chip, and a central axis of the antenna overlaps with the RFID chip; and
   wherein when defining, in a cross-sectional view in the tire-width direction, as a reference distance a distance along a tire-width direction outside surface of the second pad from a tire-radial direction outside end of the second pad until a proximal part of a folding end of the carcass ply which is folded back,
   the electronic component is arranged at the tire-width direction outside surface of the second pad within a range from a position 40% of the reference distance until a position 50% of the reference distance from the tire-radial direction outside end of the second pad towards the inner side in the tire-radial direction.

2. The tire according to claim 1, wherein the electronic component is arranged so that a distance in the tire-width direction between the electronic component and the carcass ply becomes at least the thickness of the carcass ply.

3. The tire according to claim 1, wherein the electronic component is covered by a first rubber sheet serving as a protective layer arranged on an inner side in the tire-width direction of the electronic component, and a second rubber sheet arranged on an outer side in the tire-width direction of the electronic component, and
   wherein the first rubber sheet and the second rubber sheet are configured from rubber having a higher modulus than the side wall rubber, and a lower modulus than the second pad.

4. The tire according to claim 1, wherein the second pad is provided so as to cover the outer side in the tire-width direction of part of the reinforcement ply, the first pad, the outer side in the tire-width direction of part of the bead filler, and part of the carcass ply, wherein the second pad is in contact with part of the carcass ply.

5. The tire according to claim 1, wherein the electronic component is embedded in the tire, so that the longitudinal direction thereof is a direction of the tangential line to the circumferential direction of the tire.

* * * * *